United States Patent [19]

Vico

[11] Patent Number: 4,938,001
[45] Date of Patent: Jul. 3, 1990

[54] MACHINE FOR CONTINUOUSLY PACKING PRODUCTS IN PARTICULAR FOOD OR PHARMACEUTICAL PRODUCTS IN PLASTIC MATERIAL CONTAINERS

[75] Inventor: Jean-Marie Vico, Paris, France

[73] Assignee: A.R.C.I.L., Chatou, France

[21] Appl. No.: 378,866

[22] Filed: Jul. 12, 1989

[30] Foreign Application Priority Data

Jul. 13, 1988 [FR] France ................................. 88 09533

[51] Int. Cl.⁵ ..................... B65B 47/02; B65B 61/00; B31F 5/00
[52] U.S. Cl. .......................................... 53/128; 53/141; 53/559; 156/556; 425/385; 425/398
[58] Field of Search ...................... 53/128, 131, 139.3, 53/176, 292, 296, 453, 449, 559, 563, 141, 201, 561; 425/385, 398, 400, 361; 493/169, 172, 338, 473, 475; 156/500, 556, 571

[56] References Cited

U.S. PATENT DOCUMENTS

| 3,048,952 | 8/1962 | Paal ........................................ 53/559 |
| 3,347,011 | 10/1967 | Lovas et al. ....................... 53/453 X |
| 3,673,760 | 7/1972 | Canamero et al. ................ 53/559 X |
| 3,946,537 | 3/1976 | Hair et al. .............................. 53/559 |
| 4,048,781 | 9/1977 | Johansen .............................. 53/453 |
| 4,233,801 | 11/1980 | Watt .................................... 53/559 X |
| 4,358,919 | 11/1982 | Hirota et al. ......................... 53/453 |
| 4,662,149 | 5/1987 | Hamilton ............................. 53/453 |
| 4,751,805 | 6/1988 | Walter .................................... 53/201 |

Primary Examiner—Robert L. Spruill
Assistant Examiner—Beth Bianca
Attorney, Agent, or Firm—Bell, Seltzer, Park & Gibson

[57] ABSTRACT

A machine is provided for continuously packing products, in particular food or pharmaceutical products, in plastic material containers, comprising a thermoforming station in which a horizontal platen receives two identical mold parts and is mounted for rotation about an axis between a position for thermoforming the containers and a position for receiving decorative elements for the containers.

7 Claims, 4 Drawing Sheets

MACHINE FOR CONTINUOUSLY PACKING PRODUCTS IN PARTICULAR FOOD OR PHARMACEUTICAL PRODUCTS IN PLASTIC MATERIAL CONTAINERS

BACKGROUND OF THE INVENTION

The invention relates to a machine for continuously packing products, in particular food or pharmaceutical products in plastic material containers which are sealed after filling.

Machines of this type are already known, in which the containers are produced by thermoforming a plastic material film, receive one or more doses of products, are sealed by welding or bonding to their upper face a film of material such as aluminium, a metal coated paper, or a plastic material, then go to a cutting station to be separated from each other or in groups of four, six, eight or twelve for example.

The essential drawback of these known machines is their lack of adaptability to a change of format of the containers. It should be understood that, when the plastic material film in which the containers are thermoformed, is moved from one end to the other of the machine, the tools and/or accessories of the different thermoforming, dosage, sealing and cutting stations must be controlled in perfect synchronism with respect to the movements of the plastic material film and must be positioned exactly with respect to the containers formed from the film. For this reason, the known machines are generally equipped with a longitudinal transmission shaft, the different stations are positioned very precisely and mounted permanently on the frame of the machine, and the synchronization of the tools with the travelling speed of the plastic material film is provided initially in the factory, at the time of construction of the machine. The result is that, when it is necessary to modify the machine because for example of a change of format of the containers or groups of containers, it is not sufficient to change some tools or accessories such as the thermoforming molds, the number and position of the product dosing nozzles, the number and position of the means for welding the covers and the cutting blades, it is further necessary to reposition the different stations and resynchronize the whole of the machine, which corresponds in fact to substantially complete reconstruction of the machine. That can only be done in the factory, by specialized staff, and these modification operations are extremely time-consuming and expensive.

The object of the invention is essentially to provide a machine of the above type but which is "flexible" and adaptable simply and rapidly, on the spot, to modifications such as change of format of the containers or groups of containers etc...

The invention also provides a machine of the above type which is more reliable, faster and more accurate than those of the prior art.

SUMMARY OF THE INVENTION

The invention provides then a machine for continuously packing products, in particular, food or pharmaceutical products in plastic material containers, comprising a frame equipped with means for taking up and displacing a plastic material film from one end to the other of the machine and comprising a station for thermoforming the containers, a station for introducing predetermined amounts of products into the containers, a station for sealing the containers and a cutting station, wherein said station for thermoforming the containers comprises a horizontal platen receiving two identical mold parts and mounted for rotation about a vertical axis between a thermoforming position and a position for receiving elements for decorating the containers.

It is in fact conventional for a strip of material such as paper, printed on one face and comprising a heat bonding material on the other face, to be placed inside each molding cavity, while being rolled on itself, so as to form a decoration and/or a reinforcement of the cylindrical or annular wall of a thermoformed plastic material container.

In accordance with the invention, the molding cavities of a first mold part are lined with these decorative or reinforcing elements whereas containers are thermoformed in another mold part. By rotating the rotary platen, the molding cavities lined with decorative elements are brought into the thermoforming position whereas those in which the containers have just been thermoformed are brought to a position for receiving decorative elements, in preparation for a new thermoforming operation. With this arrangement, the length of the machine can be reduced as also the duration of a cycle for manufacturing the containers and packing the products.

According to another characteristic of the invention, each molding cavity of a mold part is, in the decorative element receiving position, disposed opposite a cylindrical passage in which a decorative element is wound about a vertically moving piston, movable between a rest position in said passage and a position for placing the decorative element in the molding cavity.

According to another characteristic of the invention, plates carrying means for positioning and applying decorative elements on the walls of the molding cavities are disposed on each side of the mold part and are moved in translation with respect thereto, the means for positioning and applying decorative elements being frustums coaxial with the molding cavities and having shapes identical to those of the cavities and slightly smaller dimensions.

Ducts formed in the mold part open into the molding cavities and are connected permanently to a depression source.

The wall of the molding cavity may also comprise a circular groove connected to a depression source and retaining the decorative element applied thereagainst by suction.

Thus, and contrary to the prior art, the decorative element is applied uniformly and maintained against the wall of the molding cavity before thermoforming a container. Thus, all the problems related to positioning of the wound strip forming the decorative element, bonding in the overlapping zone of its ends and the risks of thinning of the plastic material in this zone are avoided. A decorative element may also be placed in this manner in a container having a more or less square section, which raised serious problems in the prior art.

BRIEF DESCRIPTION OF THE DRAWINGS

The invention will be better understood and other details, characteristics and advantages thereof will be clearer from reading the following description, given by way of example, with reference to the accompanying drawings in which.

DESCRIPTION OF THE PREFERRED EMBODIMENTS

Figure 1:
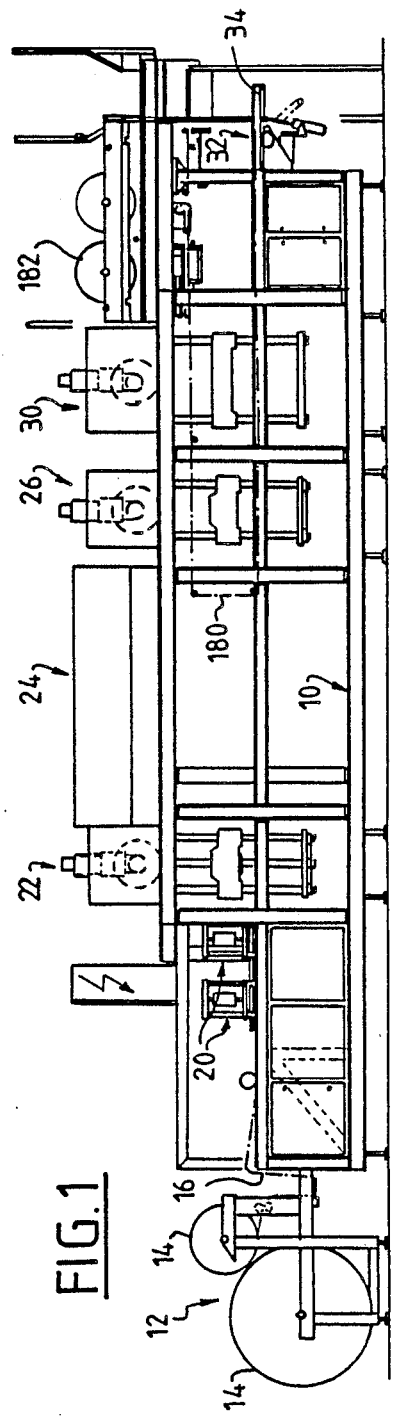
FIG. 1 is a schematic elevational view of a machine in accordance with the invention.
Figure 2:
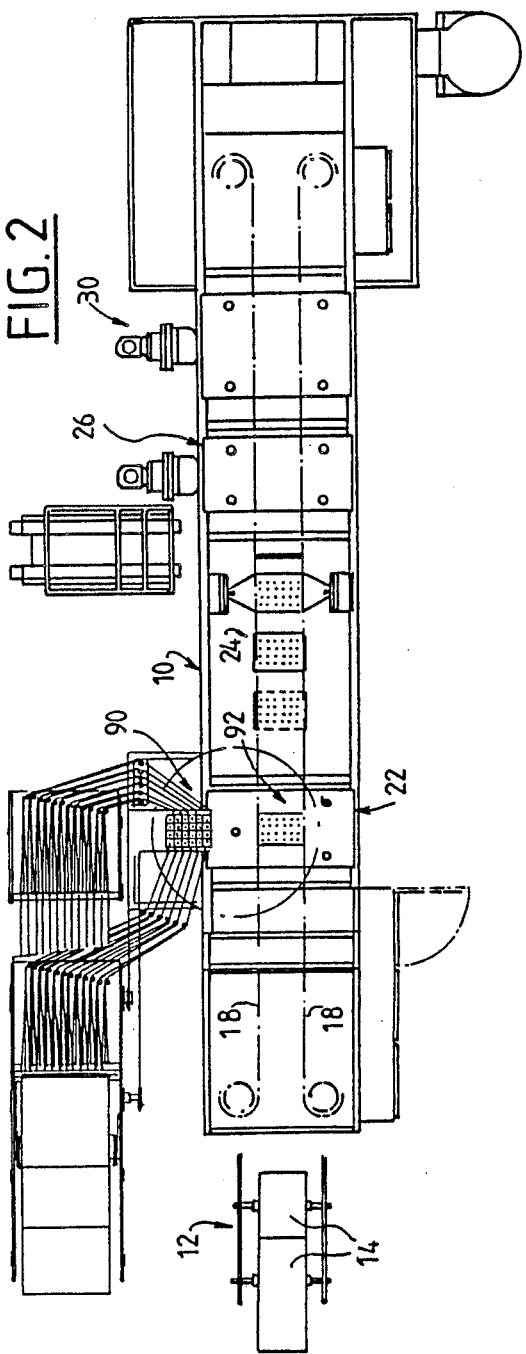
FIG. 2 is a top view of this machine.

FIGS. 1 and 2 are general views of a machine of the invention.

This machine comprises, over the whole of its length, a frame 10 at one end which is situated a station 12 for supporting and unwinding reels 14 of a plastic material film from which the containers will be thermoformed. The transfer of a reel 14 from its waiting position to its unwinding position may be motorized, as well as rotation of reel 14 about its axis in its unwinding position.

The plastic material film 16 unwound from a reel 14 forms a reserve loop at the entrance to frame 10, then is seized and moved towards the other end of the frame by parallel endless chains 18, to pass successively through heating stations 20, a decoration positioning and thermoforming station 22, a station 24 delivering predetermined amounts of products and filling the containers, a station 26 for sealing the containers and a station 30 for cutting the containers or groups of containers. A belt conveyor 32 is provided at the exit from the machine for removing the containers or groups of containers and comprises a pivoting portion 34 for discharging poorly filled or unfilled containers, controlled by detection means provided at the product dosing station. The different stations 20, 22, 24, 26, 30 of the machine are mounted for movement in longitudinal translation along frame 10 so as to permit ready modification of the machine for adapting it to changes of format of the containers or groups of containers.

Figure 3:
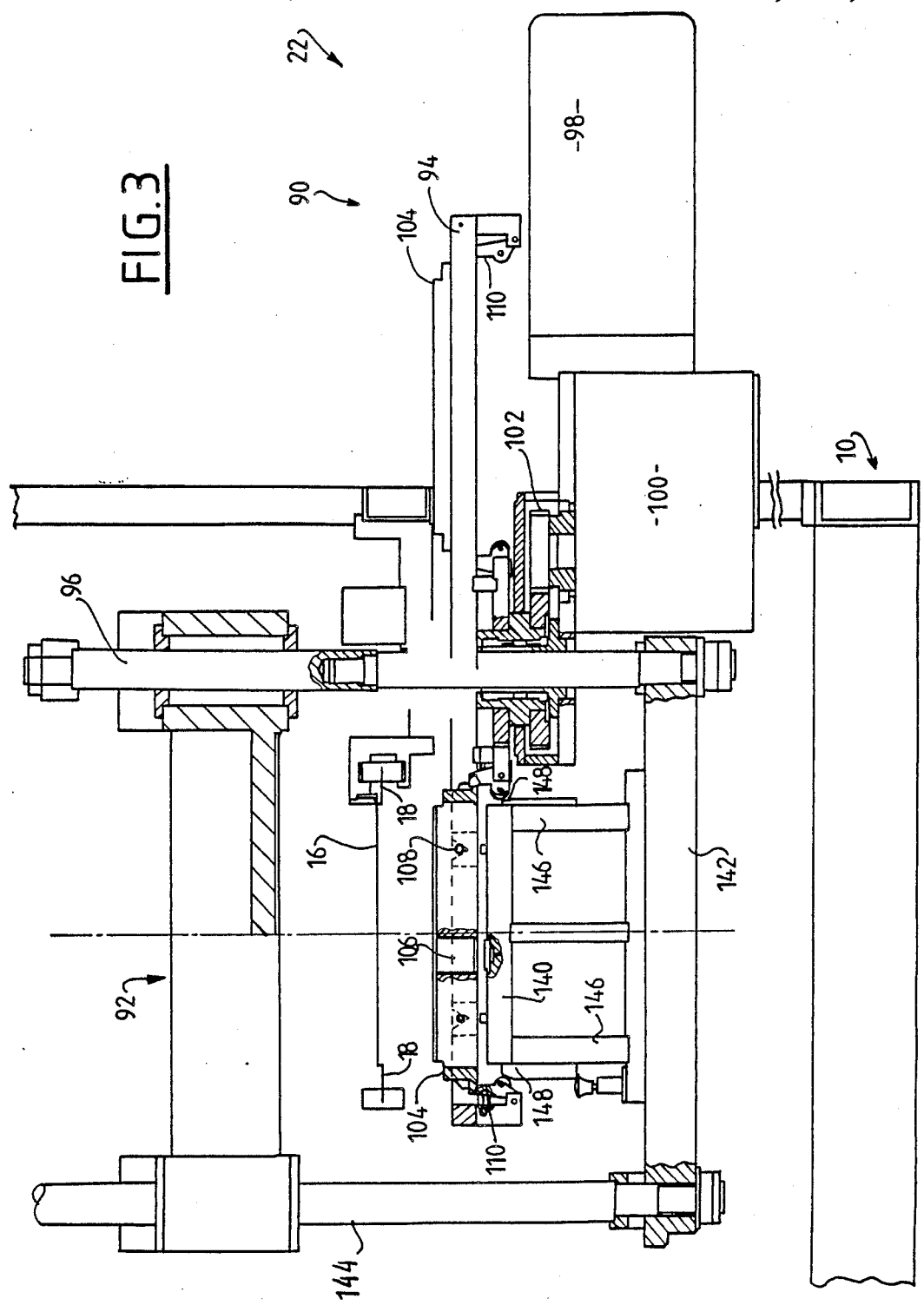
FIG. 3 is a vertical cross sectional view of a part of the thermoforming station.

Reference will now be made to FIG. 3, which shows a considerable part of the thermoforming station 22. This station comprises a portion 90 for positioning decorative elements in molding cavities and a thermoforming part 92 properly speaking. A rotating platen 94 is mounted for rotation about the axis of a vertical column 96 and is rotated by a motor 28 associated with a reducer and an indexer 100, whose output movement is transmitted to platen 94 by a gear train 102.

Platen 94 comprises two orifices for receiving a mold part or molding plate 104 having a certain number (e.g. 24) of molding cavities 106 with vertical axes, open at both their ends. Each molding plate 104 comprises on its sides horizontal fingers 108 engaged in V shaped grooves in the sidewalls of platen 94. Moreover, the base of platen 94 is equipped with pivoting lugs 110 forming hooks, associated with compression springs and intended to be engaged in grooves in the external sidewalls of the molding plates 104, for repositioning them on platen 94 and preventing rotation thereof with respect to this platen.

The two molding plates 104 carried by platen 94 are diametrically opposed with respect to the axis of column 96 so that a molding plate 104 may be in a position for receiving decorative elements whereas the other molding plate is in a thermoforming position.

Figure 4:
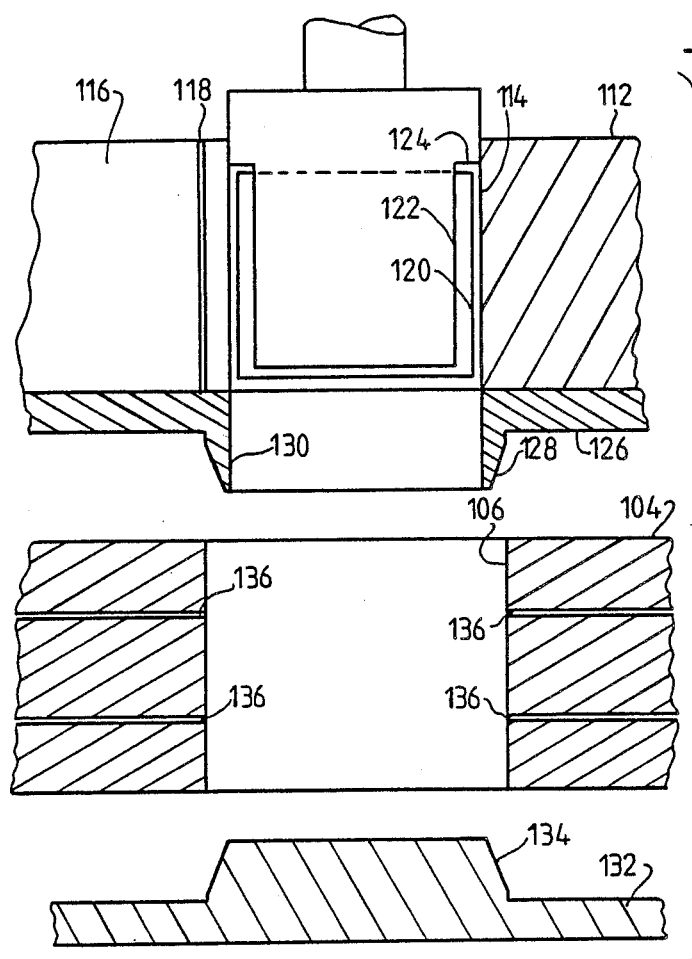
FIG. 4 is a schematic axial sectional view, on larger scale, of a device for positioning a decoration in a molding cavity.
Figure 5:
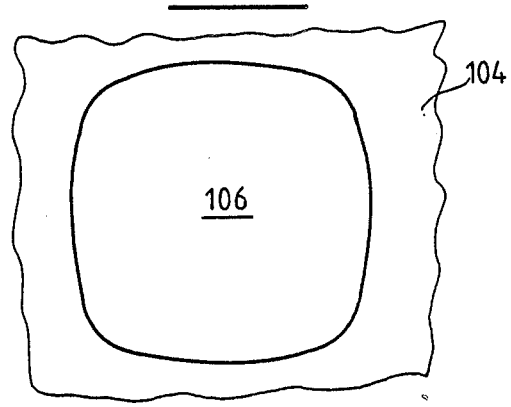
FIG. 5 is a top view of the molding cavity.

The introduction of the decorative elements in the molding cavities 106 and positioning thereof in these cavities is provided by means shown in FIGS. 4 and 5.

In FIG. 4 there has been shown in vertical section a cavity 106 of plate 104 in a position for receiving decorative elements, under a plate 112 comprising as many cylindrical passages 114 as there are molding cavities, or else between two of these plates 112 each comprising passages 114 in number equal to half the number of molding cavities 106, depending on the size of this number. When plate 104 is in the position 90 for receiving decorative elements, each cavity 106 is aligned vertically with a passage 114 of a plate 112, this passage 114 being provided with a slit 116 for admitting a printed strip forming the decorative element and a cutting means, such as a mobile blade 118, of a given length of the printed strip. Such a system is conventional and has not been described in greater detail. It makes it possible to roll on itself a given length of printed strip inside each passage 114.

The invention provides, for transferring the decorative element 120 into the molding cavity 106, a piston 122 which is movable vertically in the axis of cavity 106 between a first position in which it is in passage 114, so that the printed strip length forming the decorative element 120 may be wound about this piston, and a second position in which it is inside the molding cavity 106 after pushing the decorative element 120, by means of a shoulder 124.

A plate 126 is inserted between plates 112 and 104 and comprises on its lower face a frustum 128 oriented towards plate 104 and coaxial with the molding cavity 106.

The large base of the frustum 128 has a shape corresponding to that of cavity 106 and dimensions less than those of the cavity by an amount equal to the thickness of the decorative element 120 increased by a clearance of about 0.2 mm. This frustum 128 comprises a cylindrical axial passage 130 for passage of piston 122 and of the decorative element 120.

Under plate 104 is located another plate 132 comprising a frustum 134 coaxial with cavity 106 and oriented towards the latter—the frustum 134 has substantially the same form and the same dimensions as frustum 128 of plate 126. Ducts 136 formed in plate 104 open into cavity 106 and are connected permanently to a depression source.

The two plates 126 and 132 are movable in translation towards plate 104. When piston 122 introduces the decorative element 120 into cavity 106, plates 126 and 132 are moved towards plate 104 and the frustums penetrate into cavity 106 and apply the decorative element 120 against the wall of the cavity. The suction created by the depression in ducts 136 holds the decorative element 120 against the wall of cavity 106. In this position, the ends of the decorative element 120 overlap or cover each other partially.

Thus, the decorative element 120 will be certainly applied against the whole internal surface of the molding cavity 106, which makes it possible, among other things, to correctly position the decorative elements 120 in cavities 106 having a substantially square cross section with rounded corners. Moreover, the plastic material film may be thermoformed in cavity 106, without having to push and position the decorative element 120 in the molding cavity. Thus, any damage to this plastic material film will be avoided, particularly in the overlapping zone of the ends of the decorative element 120, as well as any poor bonding of the element in this zone.

The decorative element 120 may be conventionally formed by a paper sheet one face of which is printed and the other face of which comprises a layer of a heat bonding material. Printed and heat bonded paper strips are brought to plates 112 in a number equal to that of the molding cavities, as is shown schematically in FIG. 2. The means for guiding these strips are situated preferably on one side of the machine.

When the decorative elements 120 have been positioned in molding cavities 106, pistons 122 are brought back into the passages 114 of plates 112, the plates 126 and 132 are moved away from plate 104, and platen 94 is rotated about the axis of column 96, so as to bring the corresponding molding plate 104 to the thermoforming station 92 properly speaking. This station 92 comprises a horizontal counter-plate 140, disposed below the molding plate 104 and carried by a cross piece 142 itself mounted at the end of the vertical column 96, on the one hand, and at the end of the other two vertical columns 144, so as to be movable in vertical translation (column 96 being mounted for vertical sliding with respect to the gear train 102, by means of a conventional type bearing).

Figure 6:
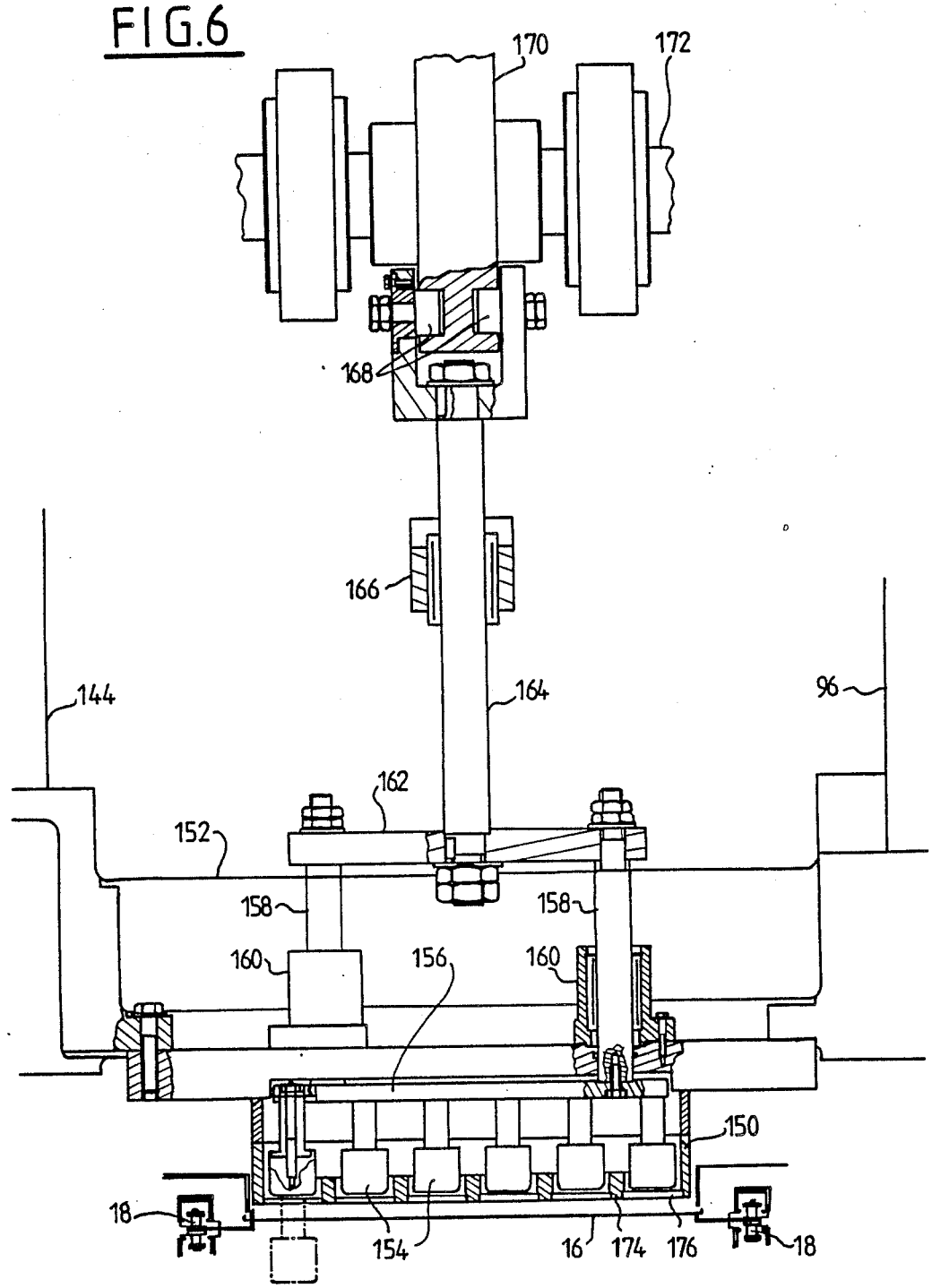
FIG. 6 shows schematically, in vertical cross section, part of the means for thermoforming the containers in accordance with the invention.

The uprights 146 joining the counter-plate 140 to the horizontal cross piece 142 comprise inclined ramps 148 for pushing and unlocking the hooks 110 holding the molding plate 104 on platen 94. Thus, when the cross piece 142 carrying the counter-plate 140 is moved upwardly, hooks 110 are unlocked by ramps 148, the counter-plate 140 is applied under the molding plate 104 and raises it for freeing platen 94. Centering pins are provided on the upper face of the counter-plate 140, as well as at least one electromagnetic stud securing the molding plate 104 and counter-plate 140 together by magnetic attraction. The molding plate-counter-plate assembly is moved upwards substantially into contact with the plastic material film 16 carried by chains 18. The containers are thermoformed by means of an assembly of punches shown schematically in FIG. 6.

In this figure, we find again the plastic material film 16 carried by chains 18. Above the film is situated a box 150 carried by a horizontal cross piece 152 guided in vertical movement along columns 96 and 144. In this box are housed punches 154 in number equal to that of the molding cavities 106, which are carried by a horizontal plate 156, guided by two vertical columns 158 in bearings 160 of the horizontal cross piece 152. A horizontal bar 162 connects the columns 158 to a vertical rod 164 itself guided for sliding in a bearing 166 fast with the frame of the thermoforming station. The upper end of rod 164 carries two rollers 168, opposite each other, housed in ball races formed in the two opposite faces of a cam 170 mounted fast with a transverse shaft 172 which is the drive shaft for the thermoforming station. Rotation of shaft 172 results then, through cam 170 and rollers 168, in a reciprocating movement of punches 164 with respect to box 150.

The lower wall of box 150 is formed by a plate 174 comprising orifices 176 for the passage of the punches 154, in the extension of the molding cavities. Cross piece 152 carrying box 150 is itself movable in translation over columns 96 and 144 so that, in the thermoforming position, box 150 is lowered slightly until it comes into contact with the molding plate 104 brought immediately below the plastic material film 16. The latter has been brought to the desired temperature by heating stations 20 provided upstream of the thermoforming station 26. The containers are thermoformed by lowering the punches in the molding cavities 106 of plate 104, and also by the action of an internal pressure of compressed air injected into these molding cavities. The plastic material is then applied intimately to the wall of the molding cavity 20 (in fact on the decorative element which is itself held against the wall of the molding cavity). The temperature of the molding material causes the decorative element to be bonded to the wall of the thermoformed container.

As far as the thermoforming is concerned, it is particularly advantageous for the punches 154 to be controlled by means of a cam rather than by jacks. The use of a cam in fact makes it possible to obtain the desired downward movement of punches 154 into the molding cavities, movement at first rapid then slowing as the plastic material film extends and cools. On the other hand, movement of the punches by a pneumatic jack will be an accelerated movement until the end of travel, which risks causing tearing of the zones of weakness of the plastic material film.

The molding cavities are cooled by water flow. The cooling of the thermoformed containers is very fast. Removal from the mold takes place as follows: punches 154 are raised inside box 150 and the latter is raised above the plastic material film 16. Simultaneously, the counter-plate 140 carrying the molding plate 104 is lowered and deposits plate 104 on platen 94. The downward movement of counter-plate 140 is continued until ramps 148 release hooks 110 which lock the molding plate 140 on platen 94.

The plastic material film 16 is again driven by chains 18 and the containers are transferred to the dosing station 24 where they may receive predetermined amounts of one or more products while passing through successive dosing and/or filling stations. The containers are then transferred to the sealing station 26. Conventionally, in the latter, on the edges of the openings of the containers is welded or bonded a film 180 (FIG. 1) of aluminium, metal coated paper, plastic material etc. . . . unwound from a reel 182 carried by the upper part of frame 10 of the machine, or else disposed on the side of frame 10 for reducing the problems of handling the reels.

The sealed containers are then transferred to the cutting station 30 to be separated from each other, or else to form assemblies of 2, 4, 6, 8 or 12 containers for example. Preferably, in accordance with the invention, star shaped or diamond shaped cuts are formed first of all in the junction edges between containers then, in a second stage, centering pins are introduced in these cuts and cut lines or pre-cut lines between containers are formed by means of blades, which pass through the tops of the diamond or star shaped cuts. The means for driving chains 18 may comprise an electromagnetic clutch de-energized when the centering pins are introduced in the diamond or star shaped cuts. Thus, the containers may be exactly positioned with respect to the tools forming the cut or pre-cut lines and the accuracy of the general positioning of the containers all along the machine is improved, any tractive force exerted forwards on a group of containers being transmitted, by the plastic material film 16, to the other groups of containers which are situated at the preceding stations of the machine. Thus, accuracy of positioning of the order of a few hundredths of a millimeter is obtained.

What is claimed is:

1. A machine for continuously packing products, in particular, food or pharmaceutical products in plastic material containers, comprising a frame equipped with means for taking up and displacing a plastic material film from one end to the other of the machine and comprising a station for thermoforming the containers, a station for introducing predetermined amounts of products into the containers, a station for sealing the containers and a cutting station, the station for thermoforming the containers comprising a horizontal platen receiving two identical mold parts and means mounting said horizontal platen for rotation about a vertical axis such that each of the two mold parts is moved successively between a thermoforming position and a position for receiving elements for decorating the containers.

2. The machine as claimed in claim 1, wherein said rotary horizontal platen comprises retractable hooks for centering and retaining the mold parts, means being provided for retracting these hooks in the thermoforming position.

3. The machine as claimed in claim 1, wherein each mold part comprises molding cavities open at their upper and lower ends, the bottoms of the cavities being formed on a lower counter-plate independent of the platen and movable in translation between an upper position in which it carries a mold part and a allows thermoforming of the containers and a lower position in which the mold part is carried by the platen and may be brought by rotation of the platen into the decorative element receiving position.

4. The machine as claimed in claim 3, wherein each molding cavity of the mold part is, in the decorative element receiving position, disposed opposite a cylindrical passage in which a decorative element is wound about a vertically moving piston, movable between a rest position in said passage and a position for placing the decorative element in the molding cavity.

5. The machine as claimed in claim 4, wherein plates carrying means for positioning and applying the decorative elements on the walls of the molding cavities are disposed on each side of the mold part and are movable in translation with respect thereto.

6. The machine as claimed in claim 5, wherein the means for positioning and applying the decorative elements are frustums coaxial with the molding cavities and have shapes identical to those of the cavities and slightly smaller dimensions.

7. The machine as claimed in one of claims 3 to 6, wherein ducts formed in the mold part open into the molding cavities and are connected permanently to a depression source.

* * * * *